United States Patent [19]

Wyman et al.

[11] Patent Number: 4,843,756
[45] Date of Patent: Jul. 4, 1989

[54] ENTRANCE GATE APPARATUS FOR FISH TRAPS

[76] Inventors: Edward W. Wyman; Robert E. Wyman, both of P.O. Box 1847, Sitka, Ak. 99835

[21] Appl. No.: 143,324

[22] Filed: Jan. 13, 1988

[51] Int. Cl.$^4$ .............................................. A01K 69/08
[52] U.S. Cl. ...................................................... 43/102
[58] Field of Search ................................... 43/100–101, 43/102, 103, 104, 105

[56] References Cited

U.S. PATENT DOCUMENTS

| | | | |
|---|---|---|---|
| 2,119,828 | 6/1938 | Nondenstam | 43/100 |
| 3,497,989 | 3/1970 | Schultz et al. | 43/100 |
| 4,107,867 | 8/1978 | Kennedy | 43/100 |
| 4,184,283 | 1/1980 | Wyman | 43/102 |
| 4,437,259 | 3/1984 | Holyoak | 43/105 |
| 4,611,424 | 9/1986 | Tarantino | 43/102 |

*Primary Examiner*—M. Jordan

[57] ABSTRACT

In fish or crab traps of the type that are lowered into and left in the water, an improved entrance gate apparatus for allowing entry of fish into, and preventing egress of fish from, the fish trap. The entrance gate apparatus is self-contained and adapted to be rapidly attached to, and through the wall of a fish trap, and in a preferred embodiment, comprises a rectangular frame to which is attached a plurality of flexible plastic finger assemblies which collectively form a converging passageway into the fish trap. The finger assemblies preferably comprise flat individual fingers with blunt ends, a width exceeding one-quarter inch, a thickness of less than 50% of the width, and a spacing for the individual fingers of at least the width, and preferably two to three times the width, of the fingers to provide good visibility through the entrance gate and into the trap. The finger assemblies are configured to present smooth surfaces to the fish and only a light pressure on the fish as the fingers are spread apart as the fish enters the trap. For economy of manufacture and increased flexibility to prevent damage to the entrance gate, the finger assemblies are preferably molded of plastic and configured for a sliding interengagement with the frame, which preferably has a C-section crosssection for increased torsional flexibility.

18 Claims, 4 Drawing Sheets

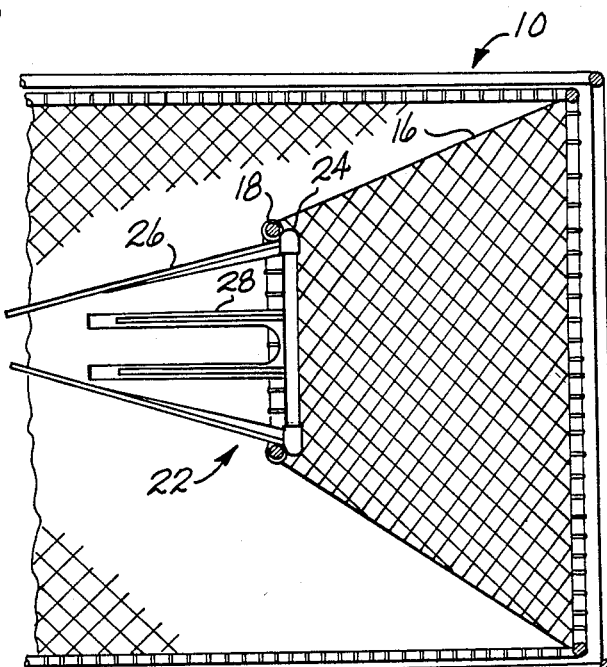
Fig. 3
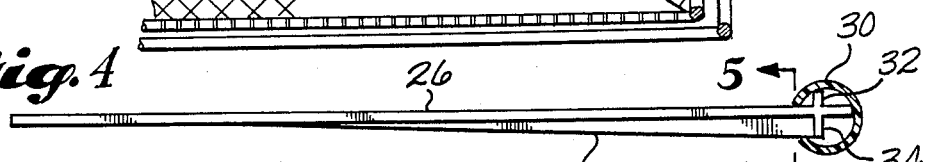
Fig. 4
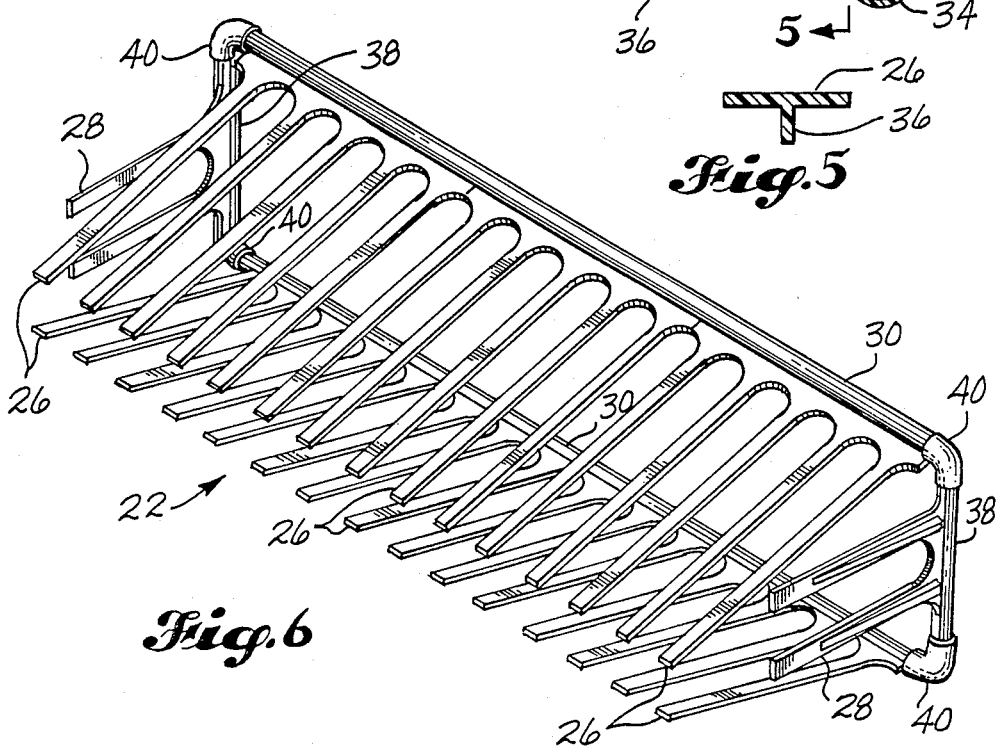
Fig. 5
Fig. 6

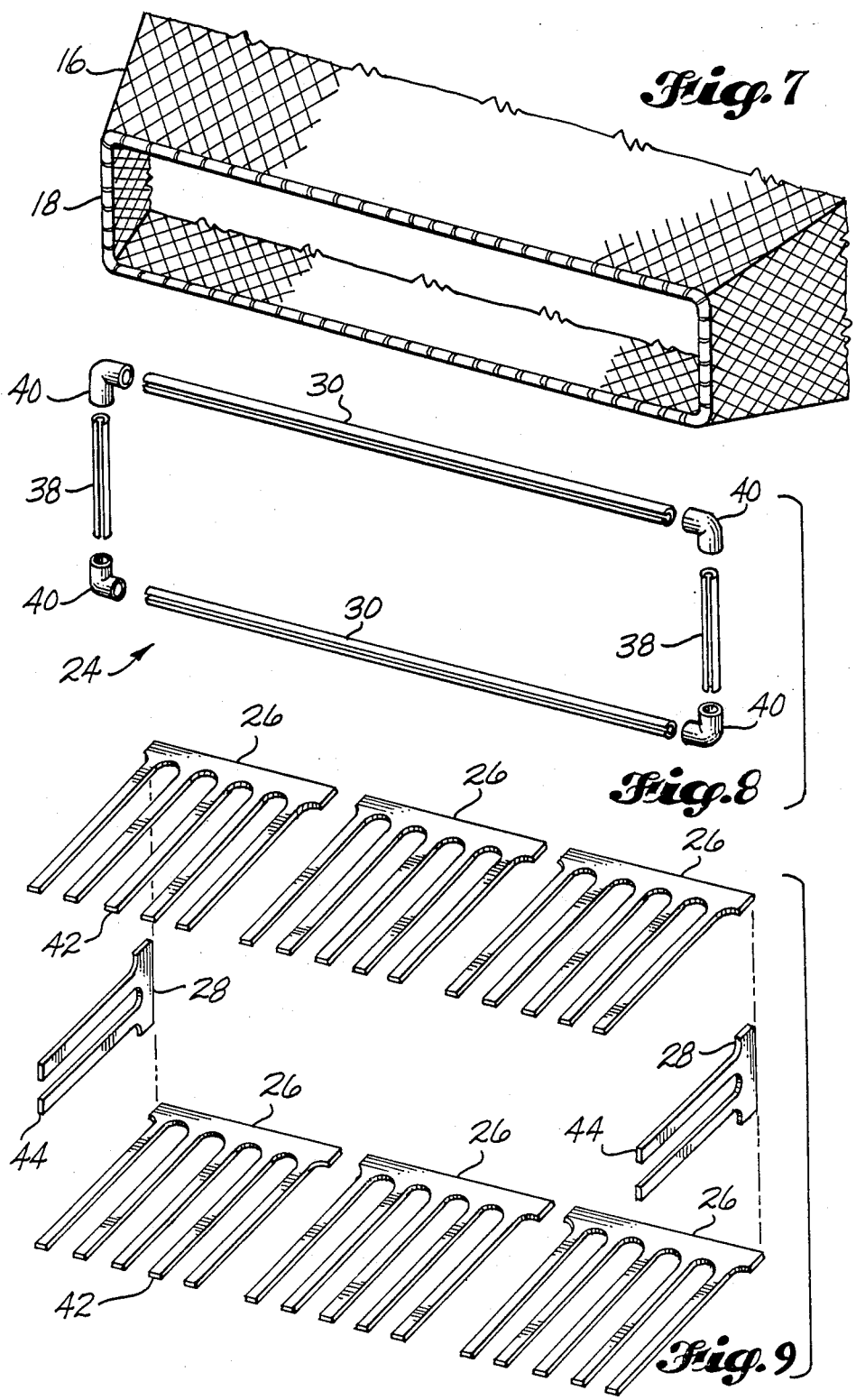

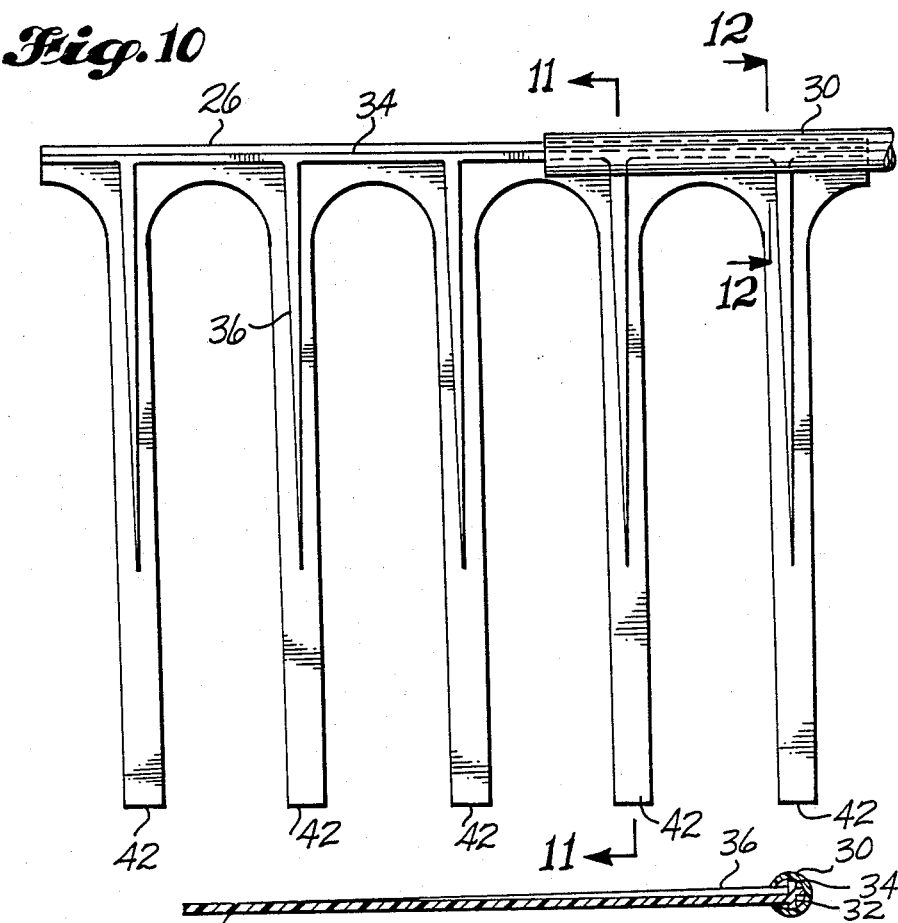
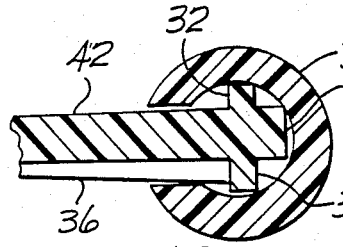
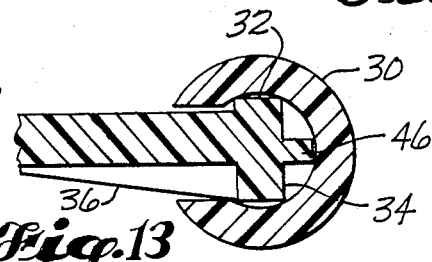
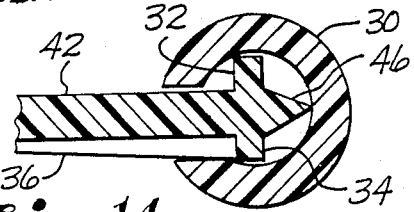
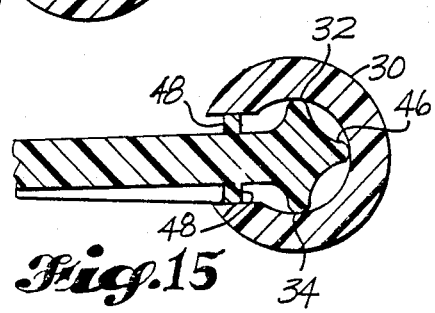

ENTRANCE GATE APPARATUS FOR FISH TRAPS

BACKGROUND OF THE INVENTION

This invention pertains to "pots" or traps for capturing shellfish or finned fish and, more particularly, to entrance gate appartus for allowing entry of fish into, and preventing egress of fish from, a fish trap.

One type of crab trap that is in common use today is shown in U.S. Pat. No. 4,184,283 issued to Robert E. Wyman, a coinventor of the entrance gate apparatus disclosed here. Such traps are formed by steel rods welded together to form a generally rectangular box structure, the walls of which are formed by nylon netting. As shown in the '283 patent, entry tunnels, formed by netting, extend inwardly from opposite ends of the trap and terminate in a rectangular frame secured to the netting, providing an opening through which the crabs fall into, and to the bottom of, the trap. Bait of pieces of meat such as herring or horsemeat is secured by a hook or cannister in a central region of such traps.

In recent years, in many regions of the world, the crab fishing industry has faced declining harvests of crabs and has been subjected to substantially shortened fishing seasons which have been imposed by fishery authorities out of necessity to preserve the future supply of crabs. As a result, crab fishermen have often been unable to realize a reasonable return on investments in crab fishing vessels and other specially designed equipment for lowering and retrieving crab traps. While the crab fishery has been declining, it is believed that there exists a continuing and largely untapped but valuable commercial fishery for finned fish of the "ground" or "bottom" varieties, such as, for example, sable fish and members of the cod family.

Accordingly, it is a specific object of this invention to provide apparatus for quickly and economically converting crab traps into traps which may be used for effectively harvesting cod and other bottom fish.

In the past, a great many devices have been proposed for capturing fish and other animals in a trap. Such devices are described in patents found in U.S. Patent Office Class 43 and subclasses 65, 66, 77, 81, 100, 102, 103, and 105. For example, U.S. Pat. No. 3,337,982 to Sajulan shows a fish trap having a plurality of fish entry passages 10, the walls of which are formed by chicken wire that extends into the passages to provide rows of fingers or prongs 17 that the fish must pass through on its way into the trap. Also, U.S. Pat. No. 4,107,867 to Kennedy shows a catfish trap having two successive entry passages that are sized and arranged to capture fish of a predetermined size. U.S. Pat. No. 3,271,894 to Manno shows a "head" or entry passage for a shellfish trap in which the heads 25 are conical in shape with "closely spaced" pointed fingers 32 formed by splitting the conical shell of the head. However, none of these references suggest apparatus suitable for quickly and economically converting conventional crab, or other similar traps into traps that may be used for harvesting cod and other bottom fish without injuring them.

It is a further specific object of this invention to provide an entrance gate apparatus for a fish trap which will: (1) allow fish to easily observe bait, and other fish pursuing the bait, inside the trap; (2) allow fish to enter the trap through the gate with ease; (3) prevent fish within the trap from exiting through the gate; (4) not injure or puncture the flesh of fish entering or attempting to leave the trap through the gate; (5) be of durable, flexible, an nonbrittle construction such that damage will not be sustained when the trap is loaded with fish and it is being hauled through and out of the water; (6) be economical to manufacture and and assemble; and (7) be easy to quickly install and remove from a generally conventional crab or other fish trap.

SUMMARY OF THE INVENTION

The entrance gate apparatus of this invention is, in a preferred embodiment, self-contained and adapted to be rapidly attached to, and through, an exterior wall of a fish trap. The gate apparatus comprises a rectangular frame assembly suitable for nesting insertion with, and attachment to, a similar frame attached to the wall of the fish trap. A plurality of flexible plastic finger assemblies are attached to, and extend inwardly from the frame to form a converging passageway into the fish trap. The finger assemblies preferably comprise flat flexible fingers having a width exceeding one-quarter inch, and a thickness of less than 50% of the width; wherein the individual fingers are spaced apart by at least the average width, and preferably two to three times the average width, of the fingers in order to provide good visibility through the entrance gate and into the trap. The finger assemblies are preferably molded from a durable plastic and are configured to present flat or smooth edges to the fish, to thereby avoid inflicting injuries which would reduce the market value of the fish. Also, for economy of manufacture and increased flexibility, the finger assemblies and frame are configured for a sliding interengagement with the C-section of the frame members, which results in a reduced torsional rigidity and increased flexibility for the entrance gate apparatus.

As a fish approaches the entrance gate, it will be able to observe the interior of the trap, the bait, and perhaps other fish going after the bait. As the fish proceeds through the entrance gate, the body of the fish will displace outwardly the flexible finger assemblies with very little pressure being applied to them. After the fish passes through the gate, the flexible fingers will return to their original, and unflexed, positions. Egress from the trap of fish large enough to displace the fingers will be prevented because, in their unflexed positions, the fingers will present only their stiff longitudinal flat ends to a fish attempting to re-enter the entrance gate from within the trap.

BRIEF DESCRIPTION OF THE DRAWINGS

FIG. 3 is a cross-sectional view taken at 3—3 in FIG. 2.

FIG. 4 is a side view showing one of the fingers of the entrance gate apparatus of FIG. 3.

FIG. 5 is a cross-section view taken at 5—5 in FIG. 4.

FIG. 6 is an isolated perspective view of the entrance gate apparatus of this invention.

FIG. 7 is a fragmented perspective view of one of the framed opening in the fish trap 10.

FIG. 8 is an exploded perspective view of the frame of the entrance gate apparatus of this invention.

FIG. 9 is an exploded perspective view of the finger assemblies of the entrance gate apparatus as they are positioned for installation into the frame of FIG. 8.

FIG. 10 is an expanded plan view of one of the molded finger assemblies, shown here being installed into a frame member.

FIG. 11 is a cross-sectional view taken at 11—11 in FIG. 10.

FIG. 12 is a cross-sectional view taken at 12—12 in FIG. 10.

FIGS. 13, 14, and 15 are cross-sectional views similar to FIG. 12 which show optional configurations for the finger assemblies.

DETAILED DESCRIPTION

Figure 1:
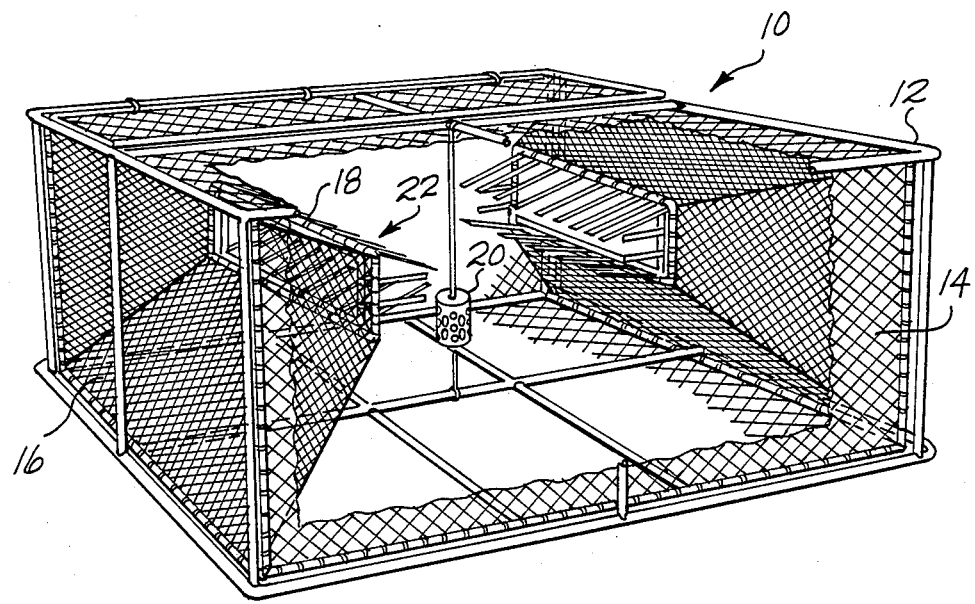
FIG. 1 is a perspective view of a crab or fish trap with the entrance gate apparatus of this invention installed in opposite framed openings of the trap.

With reference to FIG. 1, a generally conventional crab trap 10 is constructed of steel bars that are welded together to form a rectangular box structure with the walls formed by nylon netting 14. Such crab traps are often about seven feet by seven feet by three feet high and weigh up to 600 lbs. each. The opposed end walls 16 are sloped to form converging tunnels which terminate at rectangular trap frames 18. A bait container 20 is located in a central region of the trap. The entrance gate apparatus 22 of this invention is shown installed in a nesting relationship with the rectangular frame 18. The entrance apparatus 22, which will be shown in more detail in other figures of the drawings, is secured to the frames 18 by convenient means such as electrical tie bands (not shown) that may be drawn tight around the frames of the apparatus 22 and the frames 18 of the trap 10. As shown here, the gate apparatus 22 may quickly and easily be installed in and removed from the trap 10.

Figure 2:
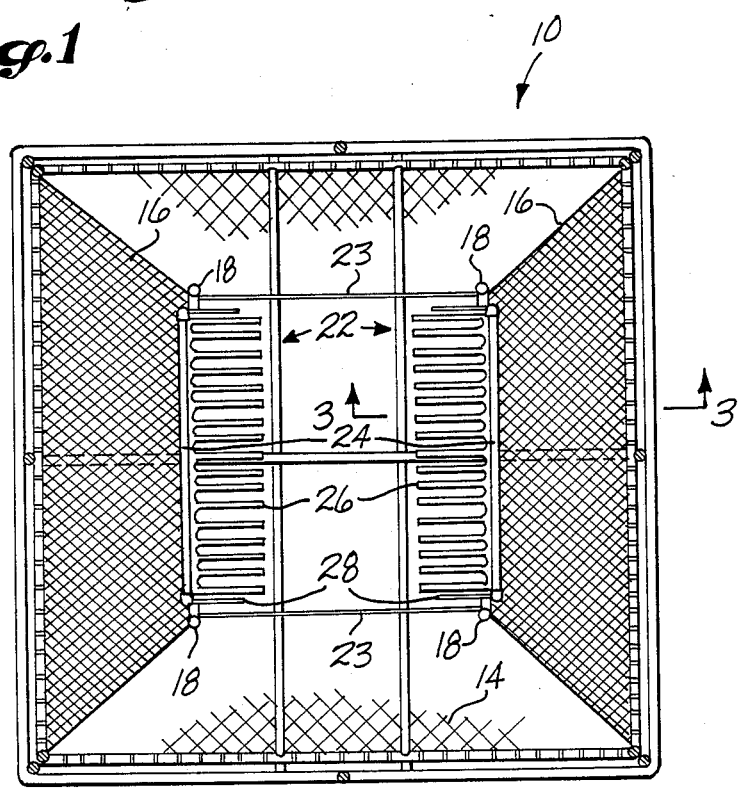
FIG. 2 is a sectional plan view taken through the entrance gate apparatus of FIG. 1.

FIG. 2 is a sectional plan view taken through the entrance gate apparatus 22. The rectangular frames 18 are permanently attached to the netting 14 at the end walls 16. As can be seen in FIG. 2, the frame 24 is longitudinally shorter by about 3 inches than the frame 18. This allows a space for attaching tension tie cords 23. Cords 23 are shown attached to the frames 18 at each end and drawn tight to urge the end walls 16 together to form a unitary structure for the interior of the trap 10. The entrance gate apparatus, two of which are shown here, includes a frame 24, horizontal or longitudinal flexible finger assemblies 26, and side or transverse flexible finger assemblies 28 which together form a vertically or transversely converging passageway into the fish trap 10.

FIG. 3 is a cross-sectional view taken at 3—3 in FIG. 2. The frame 24 of the entrance gate apparatus 22 is shown to be in nesting engagement with the frame 18 which is secured to the end walls 16 of the netting 14. Frames 18 and 24 are secured together by any convenient means such as electrical tie bands (not shown). It will be understood that the entrance gate frame 24 may, if desired, be mounted on either side of frame 18.

FIG. 4 illustrates, in an enlarged view, a longitudinal flexible finger assembly 26 and a preferred method of slide-in attachment of assembly 26 to a longitudinal pipe member 30 of the frame 24. As shown, the pipe member 30 has been extruded into a C-section cross-sectional shape. As will be described, the C-section allows rapid and convenient attachment by sliding the finger assembly into an open end of the pipe member 30. Of equal importance, however, the use of the "open" C-section cross-sectional shape for the longitudinal pipe member 30 provides a torsional rigidity which is substantially less than that of a "closed" cross-sectional shape. Accordingly, the increased torsional flexibility of the pipe members will allow the entrance gate apparatus to distort and deform without breaking of parts or other damage when the gate apparatus is under high loads; e.g., when the trap is full of fish and is being hauled through or out of the water.

The finger assembly 26 is molded to have upstanding lugs 32 and reinforcing ribs 34 which will slidingly fit into an open end of pipe member 30. A stiffness rib 36 is also integrally molded to provide a variable stiffness along the length of the finger assembly 26.

FIG. 5 is a cross-sectional view taken at 5—5 in FIG. 4 and shows the stiffness rib 36 extending from the finger assembly 26. It will be understood that the stiffness rib 36 will be designed to provide a desired stiffness for the finger assembly 26, and that the rib 36 may be eliminated altogether for certain applications.

FIG. 6 is a perspective view of the entrance gate apparatus of this invention. Longitudinal pipe members 30 and transverse pipe members 38 are joined together by corner or elbow members 40 attached by adhesive to form the frame 24. Three upper, and three lower horizontal or longitudinal finger assemblies 26 are attached to, or secured within, longitudinal pipe members 30. The pipe members 30 will act as torsioning devices and will twist to provide means for allowing deflection of the finger assemblies 26 under loads which might otherwise damage them; for example, from a large catch of fish being hauled through or from the water or when being unloaded or dumped from the fish trap. Similarly, the side or transverse finger assemblies 28 are secured within the transverse pipe members 38.

FIG. 7 is an isolated perspective view of the frame 18 showing its attachment to the end walls 16 of the trap 10.

FIG. 8 is an exploded perspective view of the frame 24, showing elbow members 40 and the preferred C-section cross-sectional shape of the longitudinal pipe members 30 and transverse pipe members 38. The angle at which the finger assemblies 26 extend from the longitudinal pipe members 30 will establish the rate of transverse convergence of the passageway of the entrance gate apparatus. Accordingly, during construction of the entrance gate apparatus 22, the slots of the C-section pipe members 30 and 38 should be oriented and angularly adjusted to provide the desired configuration for the entrance gate passageway.

FIG. 9 is an exploded perspective view of the longitudinal finger assemblies 26 and the side or transverse finger assemblies 28. These finger assemblies are preferably molded of a durable plastic in a single mold. The basic molded shape preferably includes one of the longitudinal finger assemblies 26 which has five individual fingers 42. The two side or transverse finger assemblies may conveniently be cut from one of the molded assemblies 26 to contain two individual fingers 44 which may be trimmed to be shorter in length than the fingers 42.

FIG. 10 shows one of the finger assemblies 26 being slid into a pipe member 30. The reinforcing rib 34 can be seen to extend across the width of the finger assembly 26, and the stiffness rib 36 to taper to a "run out" past the midpoint of the length of each individual finger 42.

FIG. 11 is a cross-sectional view taken at 11—11 in FIG. 10 showing an individual finger 42 with a stiffness rib 36. Upstanding lugs 32 and reinforcing ribs 34 are shown to have a snug fit engaging the interior of the pipe member 30.

FIGS. 12, 13 and 14 illustrate various cross-sectional shapes, in twice actual size, which may be used to secure the finger assemblies 26 to the pipe members 30. In these figures, the pipe members 30 may be seen to have cross-sectional shapes approximating a C-section. The pipe member 30, for example, may have an exterior diameter of ⅜ inch, an interior diameter of 5/16 inch and an opening or slot ¼ inch wide.

In FIG. 12, the upstanding lug 32 and the reinforcing rib 34 have a snug fit with the interior of the pipe member 30, as does an extension 46 of the finger 42. The stiffness rib 36 nests against an edge of the slot of the pipe member 30.

FIG. 13 shows a similar cross-sectional shape, with a wider lug 32 and rib 34, wherein the extension 46 has been reduced in size.

FIG. 14 is similar to FIG. 12 except that the extension 46 is triangulated in shape for easier insertion of the section into the pipe member 30.

FIG. 15 shows an optional cross-sectional shape wherein the C-section of the pipe member 30 closes to a slot about ⅛inch wide and the sides of the slot are rounded as shown and are in nesting engagement with finger 42. The lug 32, rib 34 and extension 46 also have rounded shapes to nest with the interior of the pipe member 30. It will be noted in FIG. 15 that the individual finger 42 is not provided with a stiffening rib 36. The variable stiffness feature provided by rib 36 may or may not be desired in these or other configurations, depending upon the type of materials used and experience gained with the use of the entrance gate apparatus in various physical environments. If desired, variable stiffness may also be achieved simply by varying the thickness of the finger 42. In each of the cross-sectional illustrations of FIGS. 12 through 15, means are shown for securing the finger assemblies within the interior of the pipe members while allowing a sliding engagement and a snug frictional fit between them.

While particular embodiments of the invention have been disclosed herein, it will be readily apparent to persons skilled in the art to which this invention pertains that numerous changes, modifications, and substitutions of equivalent components and means may be made without departing from the spirit of the invention that has been disclosed herein.

For example, in order to provide for convenience in the manufacturing process and to achieve a desired degree of flexibility to prevent damage to the entrance gate apparatus, the preferred embodiment that has been disclosed here involves frame members having an open cross-sectional shape with matching cross-sectional shapes for the finger assemblies. However, persons skilled in the art will readily recognize that the finger assemblies may be secured to the frame members by other means, e.g., by metal screws or similar attachment devices.

Also, it will be understood that while the preferred embodiment shows the blunt end of the fingers to be flat, that a rounded or other shape may be used so long as there is no real potential for injury to the fish as it passes out of the entrance gate apparatus and into the fish trap.

It will similarly be recognized that means other than flexible fingers may be used on the transverse sides of the gate to prevent transit of fish through those areas, particularly where the transverse sides are short or narrow.

Matters such as selection of colors for the entrance gate apparatus and possible addition of odors or scents to the materials used to attract fish are best left to routine experimentation in the environment in which the apparatus will be used.

Accordingly, the scope of this invention is to be considered limited only by the spirit and scope of the elements of the appended claims or their reasonable equivalents.

The invention in which an exclusive right is claimed is defined as follows:

1. In fish traps of the type that are provided with bait or a lure for attracting fish and are lowered into and left in the water, an entrance gate apparatus comprising:
   a rectangular frame assembled from two longitudinal and two transverse members;
   flexible finger assemblies secured to said two longitudinal members of said frame such that the finger assemblies form a passageway converging in a transverse direction;
   wherein said flexible finer assemblies comprise individual fingers extending along said passageway;
   wherein said two longitudinal members have an open cross-section and said flexible finger assemblies are provided with cross-sectional shapes adapted for a sliding fit into the interior of said open cross-section; and
   said individual fingers have a predetermined flexibility such that they are displaced outwardly under light pressures from fish pressing against said individual fingers to open a passageway through which fish may pass.

2. The entrance gate apparatus of claim 1 wherein said open cross-section is a C-section.

3. The entrance gate apparatus of claim 1 wherein flexible finger assemblies are secured to said two transverse members to form opposite boundaries of said passageway.

4. The entrance gate apparatus of claim 1 wherein said individual fingers have a variable stiffness that decreases in a direction away from said frame.

5. The entrance gate apparatus of claim 1 wherein the thickness of said individual fingers is less than 50% of the width of said individual fingers.

6. The entrance gate apparatus of claim 1 wherein the average width of said individual fingers exceeds one-quarter inch.

7. The entrance gate apparatus of claim 1 wherein said individual fingers are spaced apart by a distance exceeding twice the average width of said fingers.

8. The entrance gate apparatus of claim 1 wherein said individual fingers are spaced apart by a distance exceeding three times the average width of said fingers.

9. The entrance gate apparatus of claim 1 wherein said frame is sized to be secured to a similar trap frame attached to a wall of said fish trap.

10. The entrance gate apparatus of claim 9 wherein said frame is sized to be smaller than said trap frame in a longitudinal direction.

11. In fishing traps of the type that are provided with bait or a lure for attracting fish and are lowered into and left in the water, an entrance gate apparatus comprising:
    an entrance gate frame adapted to be attached to a wall of said trap;
    flexible finger assemblies secured to, and extending inwardly into the trap from, the gate frame to form the boundaries of a passageway having an open end and controlling the movement of fish into said trap;
    wherein said frame has an open cross-section and said flexible finger assemblies are provided with cross-sectional shapes adapted for a sliding fit into the interior of said open cross-section and wherein said frame and said individual fingers have a predetermined flexibility such that the individual fingers will be displaced outwardly under light pressures to open a passageway through which fish may pass and will return to their original positions upon relief from the pressures.

12. The entrance gate apparatus of claim 11 wherein said frame is a rectangular frame assembled from two longitudinal and two transverse members and wherein said flexible finger, assemblies are secured to said two longitudinal members of said frame such that the finger assemblies form a passageway converging in a transverse direction.

13. The entrance gate apparatus of claim 11 wherein said open cross-section is a C-section.

14. The entrance gate apparatus of claim 12 wherein flexible finger assemblies are secured to said two transverse members to form opposite boundaries of said passageway.

15. The entrance gate apparatus of claim 11 wherein said individual fingers have a variable stiffness that decreases in a direction away from said frame.

16. The entrance gate apparatus of claim 11 wherein said frame is sized to be secured to a similar trap frame attached to a wall of said fish trap.

17. The entrance gate apparatus of claim 12 wherein said rectangular frame is adapted to be secured to a similar trap frame attached to a wall of said fish trap and is sized to be smaller in a longitudinal direction than said trap frame.

18. In fish traps of the type that are provided with bait or a lure for attracting fish and are lowered into and left in the water to be retrieved at a later time, an entrance gate apparatus adapted to be rapidly attached to, and remaved from, an outer surface of a fish trap, said entrance gate comprising:

a rectangular frame assembled from two longitudinal members, two transverse members, and four elbow members, wherein said two longitudinal members have an open cross-section;

flexible finger assemblies molded from plastic and provided with cross-sectional shapes adapted for a sliding fit into the interior of said open cross-section to thereby secure them to said longitudinal members to form a passageway converging to an open end in a transverse direction;

wherein each of said flexible finger assemblies include a plurality of individual fingers having a width exceeding one-quarter inch, a thickness of less than 50% of said width, and a substantially blunt end at the open end of said passageway;

wherein said individual fingers are spaced apart by an average distance exceeding three times the average width of said individual fingers;

wherein said frame and said flexible finger assemblies have a predetermined flexibility such that the individual fingers will be displaced outwardly under light pressures from fish passing through the entrance gate and the individual fingers will return to their original positions after the fish have passed through the entrance gate; and wherein said individual fingers present smooth and blunt surfaces along the interior boundaries of said passageway to prevent injury to fish passing through the entrance gate.

* * * * *